US010744872B2

(12) United States Patent
Pelger et al.

(10) Patent No.: US 10,744,872 B2
(45) Date of Patent: Aug. 18, 2020

(54) MOTOR VEHICLE WITH AT LEAST TWO TANKS FOR RECEIVING FUEL UNDER HIGH PRESSURE

(71) Applicant: Bayerische Motoren Werke Aktiengesellschaft, Munich (DE)

(72) Inventors: Andreas Pelger, Ismaning (DE); Klaus Szoucsek, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 129 days.

(21) Appl. No.: 15/995,168

(22) Filed: Jun. 1, 2018

(65) Prior Publication Data

US 2018/0272864 A1 Sep. 27, 2018

Related U.S. Application Data

(63) Continuation of application No. PCT/EP2016/079309, filed on Nov. 30, 2016.

(30) Foreign Application Priority Data

Dec. 3, 2015 (DE) .................. 10 2015 224 243

(51) Int. Cl.
*B60K 15/07* (2006.01)
*B60K 15/03* (2006.01)
*B60K 15/063* (2006.01)

(52) U.S. Cl.
CPC ........ *B60K 15/07* (2013.01); *B60K 15/03006* (2013.01); *B60K 2015/0321* (2013.01);
(Continued)

(58) Field of Classification Search
CPC ........... B60K 2015/03026; B60K 2015/03118; B60K 2015/03144; B60K 2015/0321;
(Continued)

(56) References Cited

U.S. PATENT DOCUMENTS 7,270,202 B2 * 9/2007 Kondo .................. B60K 1/00
180/65.1
7,337,799 B2 * 3/2008 Delfino ............ B60K 15/03006
137/266
(Continued)

FOREIGN PATENT DOCUMENTS

DE 11 2008 003 549 T5 10/2010
DE 20 2011 108 934 U1 1/2012
(Continued)

OTHER PUBLICATIONS

International Search Report (PCT/ISA/210) issued in PCT Application No. PCT/EP2016/079309 dated Apr. 6, 2017 with English translation (eight pages).
(Continued)

*Primary Examiner* — Laura Freedman
(74) *Attorney, Agent, or Firm* — Crowell & Moring LLP

(57) ABSTRACT

A two-track multi-axle motor vehicle including at least two fuel tanks in which a fuel for producing driving energy for a vehicle drive unit can be stored under high pressure of the order of magnitude of 300 bar and more is provide. Each tank includes a safety valve device having a temperature-sensitive element monitoring only a partial region of the tank surface. The safety valve device allows at least a partial quantity of the stored fuel to escape from the respective tank at a higher temperature, which can occur, for example, in the case of a fire. The temperature-sensitive elements of at least two tanks are arranged here in such a manner that the distance between a left-side wheel (RL) of that vehicle axle, in the vicinity of which the at least two fuel tanks are arranged in the vehicle, and the temperature-sensitive element closest to the left-side wheel (RL) does not significantly differ from the distance of the other of the two
(Continued)

temperature-sensitive elements from the right-side wheel (RR) of the vehicle axle.

16 Claims, 1 Drawing Sheet

(52) U.S. Cl.
CPC ............... *B60K 2015/03026* (2013.01); *B60K 2015/03315* (2013.01); *B60K 2015/03375* (2013.01); *B60K 2015/03381* (2013.01); *B60K 2015/0638* (2013.01)

(58) Field of Classification Search
CPC ........... B60K 2015/03315; B60K 2015/03375; B60K 2015/03381; B60K 2015/03561; B60K 2015/0358; B60K 2015/0638; B60K 15/03006; B60K 15/035; B60K 15/07
See application file for complete search history.

(56) References Cited

U.S. PATENT DOCUMENTS

| | | | |
|---|---|---|---|
| 7,770,679 B2* | 8/2010 | Takaku | B60K 1/04 |
| | | | 180/68.5 |
| 8,480,131 B2* | 7/2013 | Schultheis | B60K 15/07 |
| | | | 280/830 |
| 8,844,662 B2* | 9/2014 | Tsubokawa | B60K 15/013 |
| | | | 180/69.5 |
| 10,267,459 B2* | 4/2019 | Schwartz | F17C 13/12 |
| 10,328,790 B2* | 6/2019 | Sonderegger | F17C 13/12 |
| 10,359,150 B2* | 7/2019 | Pelger | F16K 31/025 |
| 10,371,587 B2* | 8/2019 | Komiya | F17C 13/026 |
| 10,493,843 B2* | 12/2019 | Okawachi | B60K 15/07 |
| 2005/0211480 A1* | 9/2005 | Kejha | B60L 50/66 |
| | | | 180/65.245 |
| 2010/0276024 A1 | 11/2010 | Iida et al. | |
| 2011/0120736 A1 | 5/2011 | Lee et al. | |
| 2014/0097260 A1 | 4/2014 | Veenstra | |
| 2019/0047404 A1* | 2/2019 | Sawai | B60K 15/03 |
| 2019/0170299 A1* | 6/2019 | Hettenkofer | F17C 5/06 |
| 2019/0219187 A1* | 7/2019 | Kunberger | F16K 17/383 |

FOREIGN PATENT DOCUMENTS

| | | |
|---|---|---|
| DE | 10 2014 209 257 A1 | 11/2015 |
| JP | 2014213817 A * | 11/2014 |

OTHER PUBLICATIONS

German-language Written Opinion (PCT/ISA/237) issued in PCT Application No. PCT/EP2016/079309 dated Apr. 6, 2017 (five pages).

* cited by examiner

MOTOR VEHICLE WITH AT LEAST TWO TANKS FOR RECEIVING FUEL UNDER HIGH PRESSURE

CROSS REFERENCE TO RELATED APPLICATIONS

This application is a continuation of PCT International Application No. PCT/EP2016/079309, filed Nov. 30, 2016, which claims priority under 35 U.S.C. § 119 from German Patent Application No. 10 2015 224 243.9, filed Dec. 3, 2015, the entire disclosures of which are herein expressly incorporated by reference.

BACKGROUND AND SUMMARY OF THE INVENTION

The invention relates to a double-track multiple-axle motor vehicle including at least two fuel tanks, in which a fuel for generating drive energy for a vehicle drive unit can be stored at a high pressure in the order of magnitude of 300 bar and more. Each tank includes a safety valve device having a temperature-sensitive element which monitors only a partial region of the tank surface. The safety valve device allows at least a partial quantity of the stored fuel to escape from the respective tank at a relatively high temperature, which can occur, for example, in the case of a fire. With respect to the prior art, reference is made by way of example to DE 11 2008 003 549 T5.

High pressure tanks for vehicles, in which, for example, hydrogen (as an energy source for an energy converter for generating drive energy) is stored, have to be depressurized in the case of a vehicle fire, in order to not allow a safety-critical situation to arise. For this purpose, at least a partial quantity of the stored hydrogen is possibly blown off in a timely and targeted manner into the surroundings. Here, there is also a vehicle fire when merely, for example, a tire of a vehicle wheel is burning, which might be brought about, for example, maliciously by a person. The fastest possible reaction to an emergency situation of this type is therefore called for, but cannot take place with absolute certainty when the tanks with their safety valve devices with temperature-sensitive elements which are often integrated into said safety valve devices are arranged in such a way as is disclosed in the document cited at the outset.

It is an object of the present invention to provide a corrective measure for said problem.

This and other objects are achieved by a motor vehicle in accordance with embodiments of the present invention. The temperature-sensitive elements of at least two tanks are arranged such that the spacing between a left-side wheel of the vehicle axle, in the vicinity of which the at least two fuel tanks are arranged in the vehicle, and the temperature-sensitive element which lies closest to the left-side wheel does not differ significantly from the spacing of the other one of said two temperature-sensitive elements from the right-side wheel of the vehicle axle. Here, a linearly measured spacing in the order of magnitude of 25% of the width of the vehicle is considered to be an insignificant spacing difference.

First, the term of a temperature-sensitive element is discussed. This can be an element which in some suitable way measures the temperature which prevails locally, that is to say in the immediate vicinity of the temperature-sensitive element, and forwards the measurement result, for example to an electronic or else mechanical control unit which, in the case of an impermissibly high temperature, triggers opening of the safety valve device or of a safety valve which is provided in the latter. As a result, a partial quantity of fuel (for example, hydrogen) can then escape from the tank. However, the temperature-sensitive element can also be an element which fulfills the two functions, melts or bursts, for example if an impermissibly high temperature prevails, and as a result exposes an outflow opening which is provided in the tank and was previously closed by way of said element.

Now discussing the features and measures which are proposed to this extent, it is therefore ensured that a temperature-sensitive element is situated in each case relatively close by both in the case of a fire (or blaze) at a left-side vehicle tire and at a right-side vehicle tire. As a result (with reference once again for the sake of simpler presentation to DE 11 2008 003 549 T5 and FIG. 1(C) therein), in the case of a fire at the right-side tire, said fire does not have to pass beyond all the tanks to the temperature-sensitive elements which are provided only on the left side first, before said elements can react. Rather, by way of the arrangement of the temperature-sensitive elements which is proposed in the present case, a reaction can occur almost instantaneously in the case of a one-sided fire. If, in an analogous manner to said prior art which has already been cited multiple times, the fuel tanks are at least approximately cylindrically shaped and are installed in the vehicle so as to lie with their cylinder axis in the vehicle transverse direction, in the case of two tanks the temperature-sensitive element in one of the two tanks is arranged so as to lie on the left, that is to say on the left head region or base region of the tank, and the temperature-sensitive element of the other tank is arranged so as to lie on the right in the vehicle, that is to say on the right head region or base region of the tank.

In the case which is mentioned above and in which more than two fuel tanks can also be provided, it can be provided, furthermore, that the filling and removal valve apparatuses of the tank lie on the same side of the vehicle in relation to the floor area of the vehicle. The laying of the lines to the filling and removal valve apparatuses of the plurality of tanks is simplified considerably as a result. In contrast, even in the case where, at any rate in one of the tanks, the temperature-sensitive element is integrated into the safety valve device and the latter for its part is integrated into the filling and removal valve device, the complexity is still acceptably low. This is by virtue of the fact that, in at least one of the other tanks, at least the temperature-sensitive element is now laid at its other end which lies opposite the filling and removal valve apparatus. For example, a safety valve apparatus which is also commonly known under the abbreviation "TPRD" with an integrated temperature-sensitive element can also be integrated into what is known as the "blind boss", which is a closure plug for a partial aperture, necessitated by manufacturing technology, in the base region of currently developed high pressure tanks for motor vehicles, which partial aperture has to be closed in any case and can now be closed by way of a "TPRD" with a blind plug function. A simple filling and removal valve apparatus without an integrated "TPRD" can then be situated on said tank so as to lie opposite on the top side.

Within the context of one advantageous development, the safety valve devices including their temperature-sensitive elements of all the fuel tanks which are installed in the vehicle can be designed such that temperature-induced opening of the safety valve device of one of the tanks also makes an outflow of fuel which is situated in the tank possible at the safety valve device/devices of the other tank or at least one other tank. In this way, critical quantities of fuel or hydrogen can be discharged as rapidly as possible from the complete tank system of the vehicle. One contemplated embodiment for this purpose is that the safety valve devices of the fuel tanks are arranged such that a blow-off opening of a first safety valve device, the temperature-sensitive element of which lies close to a first (for example, the left) vehicle side, is oriented toward the temperature-sensitive element of a second safety valve device, which temperature-sensitive element lies close to a second (for example, the right) vehicle side. Therefore, if hydrogen flows out from a safety valve device of a first tank, which safety valve device lies, for example, on the left side in the vehicle, because a fire has broken out close to said location, said hydrogen is ignited and the flame which results is directed directly toward the safety valve device which lies on the right in the vehicle or toward its temperature-sensitive element on account of the proposed orientation of the blow-out opening. As a result, said second safety valve device also opens as soon as possible. Another or an additional possibility for quasi-mutual opening of safety valve devices which in practice lie opposite one another in the vehicle (or temperature-sensitive elements of the safety valve devices) consists in that the safety valve devices of at least two tanks are connected to one another via a pressure line which is connected to that side of the safety valve devices which faces the storage volume of the respective tank. Via said pressure line, the storage volumes of at least two tanks are in practice connected directly to one another, with the result that, upon opening of a single safety valve device, the tank contents of all tanks which are connected to one another can flow out through said safety valve device. By way of a design of this type, only a single common filling and valve device apparatus can also be provided for the fuel tanks which are connected to one another via said pressure line, in order to simplify the construction.

Returning to the problem that one of the vehicle tires catches fire, it is proposed, furthermore, that those regions of the vehicle body which delimit a space which surrounds the wheels of a vehicle axle which is close to the tank are of flame retardant configuration. Here, corresponding trim elements in the wheel arches of the vehicle body are meant, in particular, which trim elements can prevent as far as possible a fire which starts there or a fire which is lit there from spreading to the outer sides of the fuel tanks of the vehicle.

Exemplary embodiments which will be described in the following text are shown in the appended outline sketches in a manner which is greatly simplified to the essentials.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
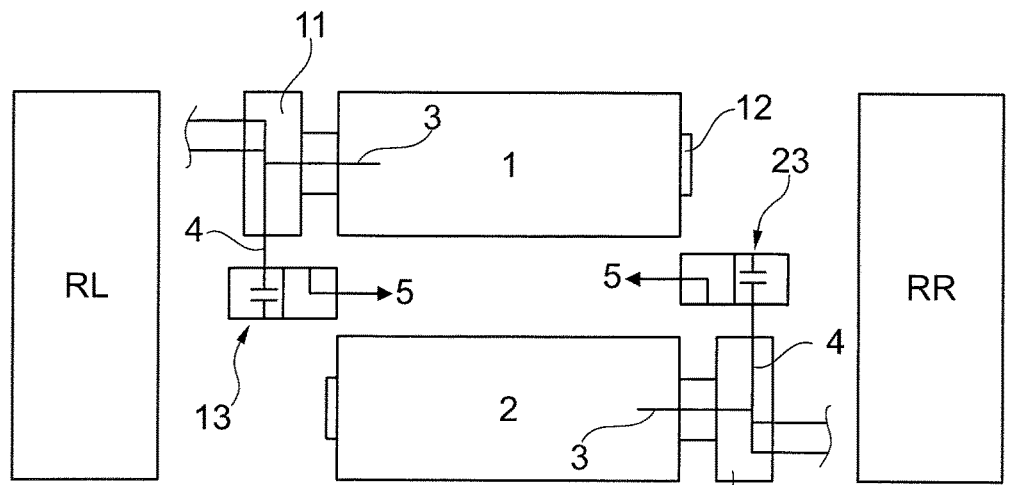
FIGS. 1-3 in each case are a plan view toward the roadway of two fuel tanks.
Figure 2:
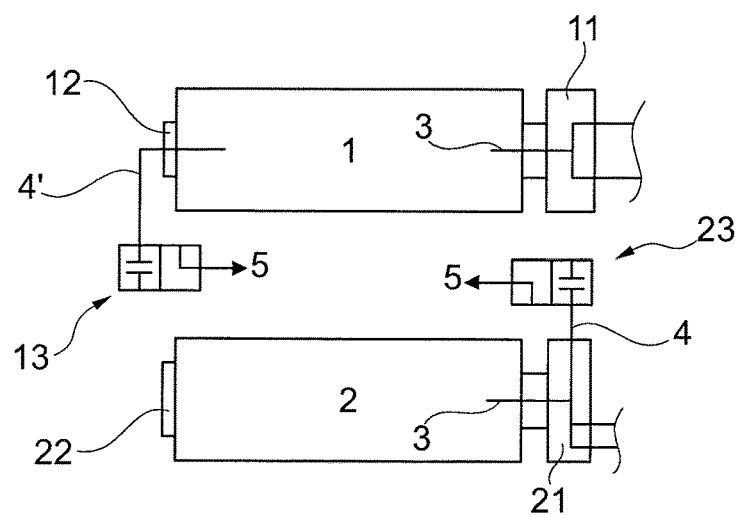
Figure 3:
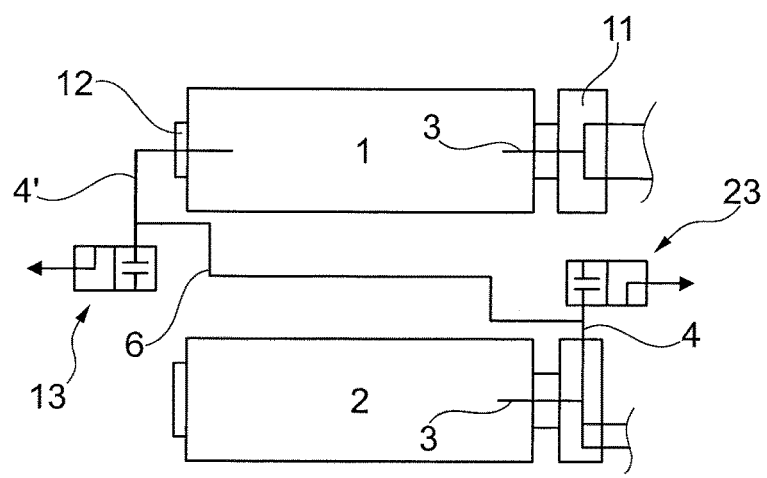

FIGS. 1-3 in each case show a plan view toward the roadway of two fuel tanks which are installed in a vehicle (not shown) so as to lie with their longitudinal axis in the vehicle transverse direction in the region of the rear axle of said vehicle and so as to be arranged behind one another in the vehicle driving direction. Merely FIG. 1 also diagrammatically shows the left-side and right-side rear wheel of the vehicle or wheel of the vehicle rear axle.

In all the figures, the designation 1 denotes a first fuel tank and the designation 2 denotes a second fuel tank, in which tanks 1, 2 a fuel, in particular hydrogen, can be stored at high pressure in the order of magnitude of up to 600 bar. A filling and removal valve device 11 (for the tank 1) and 21 (for the tank 2) is provided on the top side of each tank 1, 2, which filling and removal valve 11, 21 is connected via a line 3 to the storage volume of the associated tank 1 and 2, respectively. Constituent parts of said filling and removal valve devices 11, 21 are various valves and connectors for filling and removal lines which are known to a person skilled in the art, and are therefore not shown. A blind boss 12 and 22, that is to say a closure plug which is necessitated by the manufacturing technology for the storage volume of the respective tank 1, 2, is provided in each case on that base side of the tanks 1, 2 which lies opposite the top side.

Furthermore, a safety valve device 13, 23 which is provided for each tank 1, 2 is shown using conventional switching valve symbols, which safety valve device 13, 23 connects the respective tank storage volume to the surroundings via a discharge line 4 or 4' in the open state, and prevents an outflow of fuel or hydrogen from the respective tank 1, 2 into the surroundings in the closed state which is shown in all the figures. A blow-off opening 5 of the safety valve device 13, 23, via which blow-off opening 5 the hydrogen which flows out of the storage volume is blown off into the surroundings in the open state of said safety valve device 13, 23, is designed and oriented such that the hydrogen which exits flows with momentum in the direction of the arrow 5. Furthermore, a temperature-sensitive element (not shown) is contained in each safety valve device 13, 23 which is shown here, which temperature-sensitive element transfers the associated safety valve device 13, 23 into its open position if an impermissibly high temperature is detected in case of an emergency, in particular a temperature which occurs, e.g., in the case of a fire.

In the case of the exemplary embodiment shown in FIG. 1, the tanks 1, 2 are installed in a mirrored manner with respect to the vehicle longitudinal axis, with the result that the filling and removal valve device 11 lies on the left side in the vehicle, whereas the filling and removal valve device 21 lies on the right side in the vehicle. A branch of the abovementioned discharge line 4, which leads to the respective safety valve device 13, 23, from the line 3 which is connected to the tank storage volume is provided in each filling and removal valve device 11, 21. The associated safety valve device 13, 23, that is to say the safety valve device 13 and 23 which is assigned to the respective tank 1 and 2, respectively, is provided practically directly next to each filling and removal valve device 11, 21.

Furthermore, the left-side wheel RL of the vehicle rear axle (not shown in further detail), close to which wheel RL the fuel tanks 1, 2 are arranged in the vehicle, and the right-side wheel RR of the rear axle are shown merely diagrammatically in FIG. 1. The arrangement, as shown here, of the safety valve devices 13, 23 (with the temperature-sensitive elements which are integrated into them) ensures that the spacing between the left-side wheel RL and the temperature-sensitive element which lies closest to said wheel RL and is situated in the safety valve device 13 here does not differ significantly from the spacing of the other temperature-sensitive element which is situated in the safety valve device 23 from the right-side wheel RL.

As shown by way of the arrows 5 on the safety valve devices 13, 23, the blow-off openings 5 of said safety valve devices 13, 23 face each other. As a result, hydrogen which exits, for example, from the open left-side safety valve device 13 and ignites in this region in the case of a fire, without which fire in said region the safety valve device 13 would not be open, flows as a flame directly onto the right-side safety valve device 23, with the result that the latter opens immediately, insofar as it is not yet open.

In the case of the exemplary embodiment shown in FIG. 2, the tanks 1, 2 are installed in an identically oriented manner, with the result that each filling and removal valve device 11, 21 lies on the right side (here) in the vehicle. The safety valve device 23 of the tank 2 is provided (in an analogous manner to FIG. 1) directly next to the filling and removal valve device 21, whereas the safety valve device 13 of the tank 1 is arranged in the region of the base side of the tank 1 and is connected to the storage volume of the tank 1 via a discharge line 4' which penetrates the blind boss 12 of the tank 1. Therefore, the discharge line 4' of said safety valve device 13 from FIG. 2 has the same function as the discharge line 4 in the filling and removal valve device 21 from FIG. 2 or that discharge line in the filling and removal valve devices 11, 21 from FIG. 1, whereas it goes without saying that no line 4 is required in the filling and removal valve device 11 from FIG. 2.

The wheels RL and RR of the vehicle are not shown here (also not shown in FIG. 3 which will be described later), but the same comments apply here to the spacing conditions as in respect of FIG. 1.

In the case of the exemplary embodiment shown in FIG. 2, the blow-off openings 5 of the two safety valve devices 13, 23 also face each other in an analogous manner to FIG. 1. As a result, hydrogen which exits, for example, from the open left-side safety valve device 13 and ignites in this region in the case of a fire, without which fire in said region the safety valve device 13 would not be open, flows as a flame directly onto the right-side safety valve device 23, with the result that the latter opens immediately, insofar as it is not yet open.

In the case of the exemplary embodiment shown in FIG. 3, the tanks 1, 2 are also installed in an identically oriented manner, even if their orientation is not of significance for this exemplary embodiment. It is also essential here, however, that one of the safety valve devices 13, 23 or, in particular, its temperature-sensitive element (not shown) is arranged on the left side in the vehicle (here, the safety valve device 13), whereas the other safety valve device (here, the safety valve device 23) is arranged on the right side in the vehicle. For this reason, the safety valve device 13 is connected again to the storage volume of the tank 1 via a discharge line 4' which penetrates the blind boss 12, whereas the safety valve device 23 is connected to the storage volume of the tank 2 via a discharge line 4 and the line 3 in the filling and removal valve device 21. In a difference from the above-described exemplary embodiments, in the case of the exemplary embodiment from FIG. 3, the two safety valve devices 13, 23 are connected to one another via a pressure line 6, or said pressure line 6 specifically connects the discharge line 4 (of the safety valve device 23) to the discharge line 4' of the safety valve device 13. If only one of the two safety valve devices 13, 23 is open, hydrogen can be discharged through the safety valve device 13, 23 out of the two tanks 1, 2 into the surroundings thanks to the pressure line 6. It goes without saying that the pressure line 6 is to be of suitably safe design and, in particular, is to be protected against any damage.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A double-track multiple-axle motor vehicle comprising:
at least two fuel tanks, in which a fuel for generating drive energy for a vehicle drive unit is storable at a high pressure in the order of magnitude of 300 bar and more, each tank including only one safety valve device having a temperature-sensitive element which monitors only a partial region of a tank surface, wherein
the safety valve device is configured to allow at least a partial quantity of the stored fuel to escape from the respective tank at a relatively high temperature which occurs in the case of an emergency, and
the temperature-sensitive elements of the two fuel tanks are arranged such that a spacing between a left-side wheel (RL) of a vehicle axle, in the vicinity of which the two fuel tanks are arranged in the vehicle, and the temperature-sensitive element which lies closest to the left-side wheel (RL) does not differ significantly from a spacing of the other one of the two temperature-sensitive elements from a right-side wheel (RR) of the vehicle axle.

2. The motor vehicle according to claim 1, wherein
the two fuel tanks are approximately cylindrical fuel tanks which are installed so as to lie with their cylinder axis in a vehicle transverse direction,
the temperature-sensitive element of one fuel tank is arranged so as to lie on a left in the vehicle, and
the temperature-sensitive element of the other fuel tank is arranged so as to lie on a right in the vehicle.

3. The motor vehicle according to claim 2, wherein the tanks are arranged such that a filling and removal valve apparatus of each tank lies on the same side in relation to a floor area of the vehicle.

4. The motor vehicle according to claim 3, wherein
the safety valve devices of the tanks including the corresponding temperature-sensitive elements are configured such that temperature-induced opening of the safety valve device of one of the tanks makes an outflow of the fuel which is situated in the tank possible at the safety valve device of the other tank or at least one other tank.

5. The motor vehicle according to claim 4, wherein
the safety valve devices of the tanks are arranged such that a blow-off opening of a first safety valve device among the safety valve devices of the tanks, the temperature-sensitive element of which lies close to a first vehicle side, is oriented toward the temperature-sensitive element of a second safety valve device which lies close to a second vehicle side.

6. The motor vehicle according to claim 5, wherein
the safety valve devices of the tanks are connected to one another via a pressure line which is connected to a side of the safety valve devices which faces a storage volume of the respective tank.

7. The motor vehicle according to claim 6, further comprising:
a common filling and removal valve apparatus for at least two fuel tanks.

8. The motor vehicle according to claim 2, wherein
the safety valve devices of the tanks including the corresponding temperature-sensitive elements are configured such that temperature-induced opening of the safety valve device of one of the tanks makes an outflow of the fuel which is situated in the tank possible at the safety valve device of the other tank or at least one other tank.

9. The motor vehicle according to claim 1, wherein the tanks are arranged such that a filling and removal valve apparatus of each tank lies on the same side in relation to a floor area of the vehicle.

10. The motor vehicle according to claim 1, wherein
the safety valve devices of the tanks including the corresponding temperature-sensitive elements are configured such that temperature-induced opening of the safety valve device of one of the tanks makes an outflow of the fuel which is situated in the tank possible at the safety valve device of the other tank or at least one other tank.

11. The motor vehicle according to claim 1, wherein regions of a vehicle body which delimit a space which surrounds the wheels of the axle which is close to the tanks are of flame retardant configuration.

12. The motor vehicle according to claim 1, wherein the emergency occurs in the case of a fire.

13. A double-track multiple-axle motor vehicle, comprising:
at least two fuel tanks, in which a fuel for generating drive energy for a vehicle drive unit is storable at a high pressure in the order of magnitude of 300 bar and more, each tank including a safety valve device having a temperature-sensitive element which monitors only a partial region of a tank surface, wherein
the safety valve device is configured to allow at least a partial quantity of the stored fuel to escape from the respective tank at a relatively high temperature which occurs in the case of an emergency,
the temperature-sensitive elements of the two fuel tanks are arranged such that a spacing between a left-side wheel (RL) of a vehicle axle, in the vicinity of which the two fuel tanks are arranged in the vehicle, and the temperature-sensitive element which lies closest to the left-side wheel (RL) does not differ significantly from a spacing of the other one of the two temperature-sensitive elements from a right-side wheel (RR) of the vehicle axle,
the safety valve devices of the tanks including the corresponding temperature-sensitive elements are configured such that temperature-induced opening of the safety valve device of one of the tanks makes an outflow of the fuel which is situated in the tank possible at the safety valve device of the other tank or at least one other tank, wherein
the safety valve devices of the tanks are arranged such that a blow-off opening of a first safety valve device among the safety valve devices of the tanks, the temperature-sensitive element of which lies close to a first vehicle side, is oriented toward the temperature-sensitive element of a second safety valve device which lies close to a second vehicle side.

14. The motor vehicle according to claim 13, wherein
the safety valve devices of the tanks are connected to one another via a pressure line which is connected to a side of the safety valve devices which faces a storage volume of the respective tank.

15. A double-track multiple-axle motor vehicle, comprising:
at least two fuel tanks, in which a fuel for generating drive energy for a vehicle drive unit is storable at a high pressure in the order of magnitude of 300 bar and more, each tank including a safety valve device having a temperature-sensitive element which monitors only a partial region of a tank surface, wherein
the safety valve device is configured to allow at least a partial quantity of the stored fuel to escape from the respective tank at a relatively high temperature which occurs in the case of an emergency,
the temperature-sensitive elements of the two fuel tanks are arranged such that a spacing between a left-side wheel (RL) of a vehicle axle, in the vicinity of which the two fuel tanks are arranged in the vehicle, and the temperature-sensitive element which lies closest to the left-side wheel (RL) does not differ significantly from a spacing of the other one of the two temperature-sensitive elements from a right-side wheel (RR) of the vehicle axle,
the safety valve devices of the tanks including the corresponding temperature-sensitive elements are configured such that temperature-induced opening of the safety valve device of one of the tanks makes an outflow of the fuel which is situated in the tank possible at the safety valve device of the other tank or at least one other tank, wherein
the safety valve devices of the tanks are connected to one another via a pressure line which is connected to a side of the safety valve devices which faces a storage volume of the respective tank.

16. The motor vehicle according to claim 15, further comprising:
a common filling and removal valve apparatus for at least two fuel tanks.

* * * * *